(12) United States Patent
Yeh et al.

(10) Patent No.: US 6,392,768 B1
(45) Date of Patent: May 21, 2002

(54) DOT MATRIX HOLOGRAM WITH A HIDDEN IMAGE

(75) Inventors: Sheng-Lie Yeh; I-En Tsai; Hsiu-Hung Lin, all of Taipei (TW)

(73) Assignee: Ahead Optoelectronics, Inc., Taipei Hsien (TW)

( * ) Notice: Subject to any disclaimer, the term of this patent is extended or adjusted under 35 U.S.C. 154(b) by 0 days.

(21) Appl. No.: 09/397,700

(22) Filed: Sep. 16, 1999

(51) Int. Cl.[7] .............................. G02B 5/18; G03H 1/02
(52) U.S. Cl. .................. 359/25; 359/1; 359/2; 359/567; 359/572
(58) Field of Search ................. 359/1, 2, 20, 25, 359/29, 567, 572

(56) References Cited

U.S. PATENT DOCUMENTS

| | | | | |
|---|---|---|---|---|
| 5,032,003 A | * | 7/1991 | Antes | 359/567 |
| 5,058,992 A | * | 10/1991 | Takahashi | 359/567 |
| 5,301,062 A | * | 4/1994 | Takahashi et al. | 359/567 |
| 5,784,200 A | * | 7/1998 | Modegi | 359/567 |
| 5,909,313 A | * | 6/1999 | Lee | 359/2 |

FOREIGN PATENT DOCUMENTS

| EP | 467601 A3 | * 7/1991 | 359/567 |
|---|---|---|---|

* cited by examiner

*Primary Examiner*—Jon Henry
(74) *Attorney, Agent, or Firm*—A & J

(57) ABSTRACT

A dot matrix hologram with a hidden image is disclosed, wherein the hidden image technology is applied to a dot matrix hologram. Although the hidden image technology has been used in a conventional hologram, it has not been used in a dot matrix hologram. Although the above two kinds of hologram both can show hidden images with illuminating laser light, the disclosed dot matrix hologram with a hidden image and the conventional hologram with a hidden image use different working principles and have different detailed characteristics to create hidden image regions.

3 Claims, 4 Drawing Sheets

(a)

(b)

DOT MATRIX HOLOGRAM WITH A HIDDEN IMAGE

BACKGROUND OF THE INVENTION

The present invention relates a dot matrix hologram with a hidden image, wherein a hidden image technology is applied to a dot matrix hologram.

In a conventional hologram, for reconstructing a hidden image, even the illuminating conditions of incident laser are unchanged, the reconstructed position of the hidden image shifts apparently when the illuminated area of the hidden image region changes. However, the present invention can overcome such problem.

SUMMARY OF THE INVENTION

In the present invention, a group of grating dots are formed as a basic block of grating dots. The shape of the basic block is rectangular. In general, it is designed that the lengths of sides of the rectangular shape are approximately equal to each another. Then the basic block of grating dots is two-dimensionally periodically repeated to from a group of blocks of grating dots with a matrix arrangement to constitute the hidden image region of a hologram. Since the corresponding grating dots in all of the blocks of grating dots are identical, and the grating dots with identical pitch and angle may diffract the convergent laser light to focus at a point behind the back side of the hologram (for a transmissive type hologram) or in front of the front surface of the hologram (for a reflective type hologram), therefore, the reconstructed position of the hidden image is independent on to the position of the illumination area of the hidden image region. Since all the grating dots in each block of grating dots are different, and every grating dot serves to diffract laser beam to a bright element dot of the hidden image, therefore, wherever the hidden image region is illuminated by laser light, the same hidden image can be generated by diffraction for each bright element dot in the hidden image having its corresponding grating dot in the block of grating dots and the grating in the block being two dimensionally duplicated to form a hidden image region. Besides, by controlling the diffractive efficiency of the respective grating dots in all blocks of grating dots, the reconstructed hidden image can be shown with independent brightness at all its bright element dots. It is necessary that the size of the block of grating dot is much smaller than the position difference of the bright element dots of the hidden image. When the maximum position difference of the grating dots in a block of grating dots is much smaller than the position difference of two adjacent bright element dots of the hidden image, the position exchange of the grating dots will not affect apparently the appearance of the reconstructed hidden image. Moreover, since the blocks of grating dots in the hidden image region are formed by two dimensional duplication, thus in a general illumination, it will present a matrix type of images with the same dynamic effects simultaneously.

DESCRIPTION OF THE PREFERRED EMBODIMENT

Figure 1:
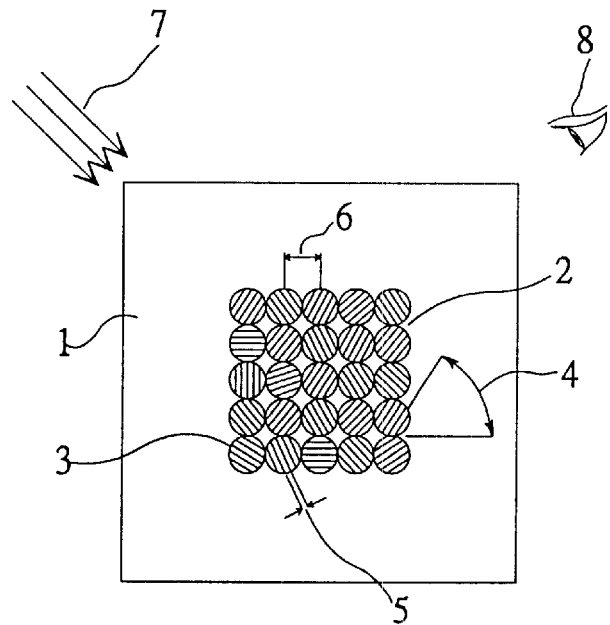
FIG. 1 is a schematic view of a dot matrix hologram.
Figure 2:
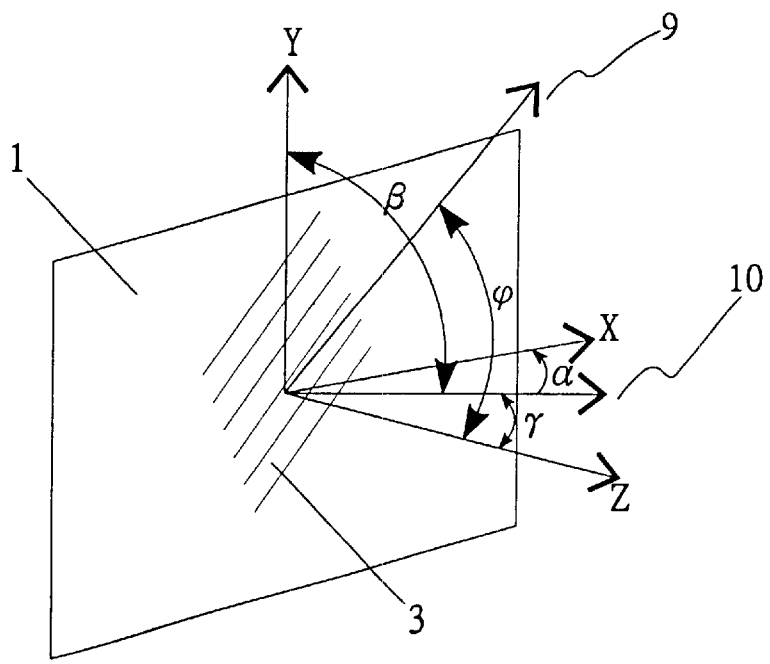
FIG. 2 is a schematic view showing diffraction of light by a grating.

With reference to FIG. 1, a schematic view of a dot matrix hologram is illustrated. The image of a dot matrix hologram is formed by many grating dots 2 arranged in order. Each grating dot 2 is formed by a grating with parallel lines. The grating angles 4 and grating pitches 5 of all grating dots are not necessary to be equal. Referring to FIG. 2, a schematic view shows that a grating diffracts light to change its progressive direction. The gratings 3 on the hologram 1 will diffract the incident light 9. Different grating angles will diffract the same monochromatic incident light from one direction into different directions. While different grating pitches 5 cause a beam of mixing-color incident light into different directions corresponding to its component light with monochromatic colors.

By aforesaid property, using a dot matrix hologram, dynamic effects with grating dots in different group being bright in turn can be created easily. The present invention uses such a property of grating to design and precisely control each grating dot so that the incident light of specific conditions is diffracted to specific positions so as to generate a specified hidden image. This is so called hidden image technology.

Figure 3:
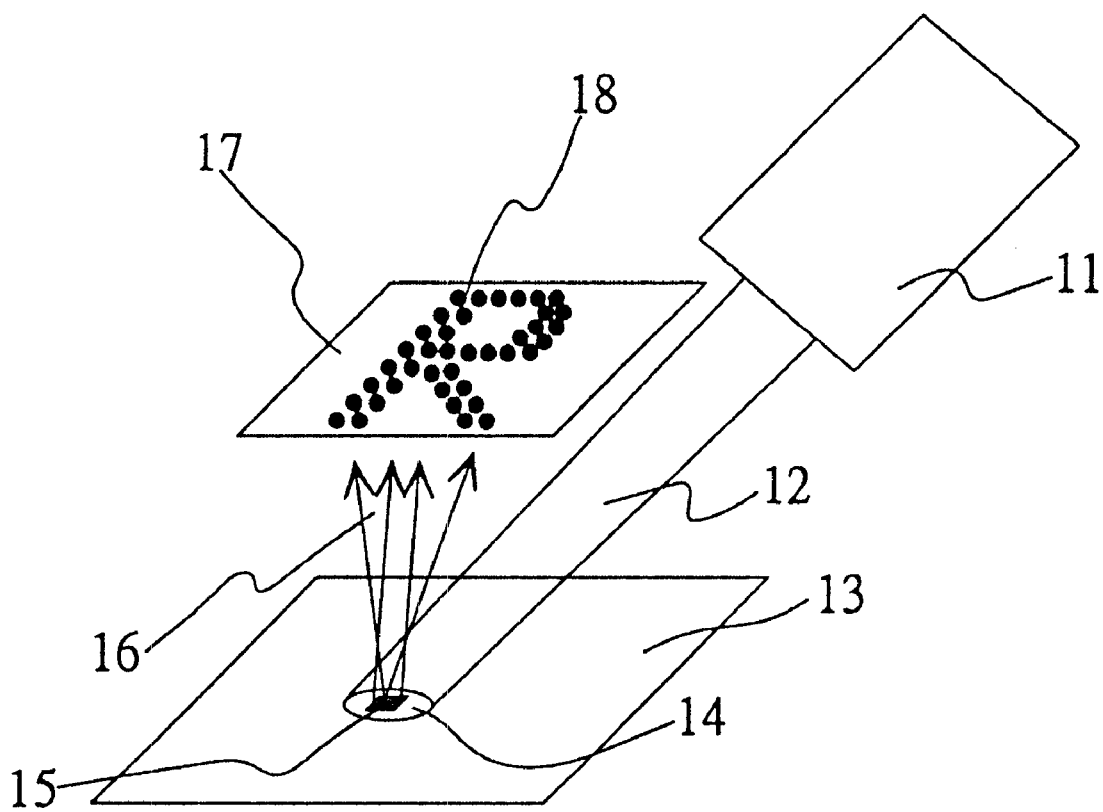
FIG. 3 is a schematic view showing that a single block of grating dots diffracts the incident laser beam to reconstruct a hidden image.

As shown in FIG. 3, a schematic view that a single basic block of grating dots serves to diffract a hidden image. It is shown that laser light 12 incidents to the hologram 13 and thus forms an illumination area 14. The block of grating dots 15 inside the illumination area will create the diffracted light 16 to reconstruct a hidden image 18 on al ground glass 17. In the present invention the number of the bright element dots of the hidden image is equal to the number of grating dots forming a basic block of grating dots 15. Different grating dots diffract laser light 12 to different bright element dots of the hidden image 18. It is most convenient that the block of grating dots 15 has a rectangular shape. In general, the length and width of the rectangular are set to be approximately equal. If the grating dots in the basic block of grating dots 15 can not completely fill the rectangular section, some vacant positions can be remained.

Figure 4:
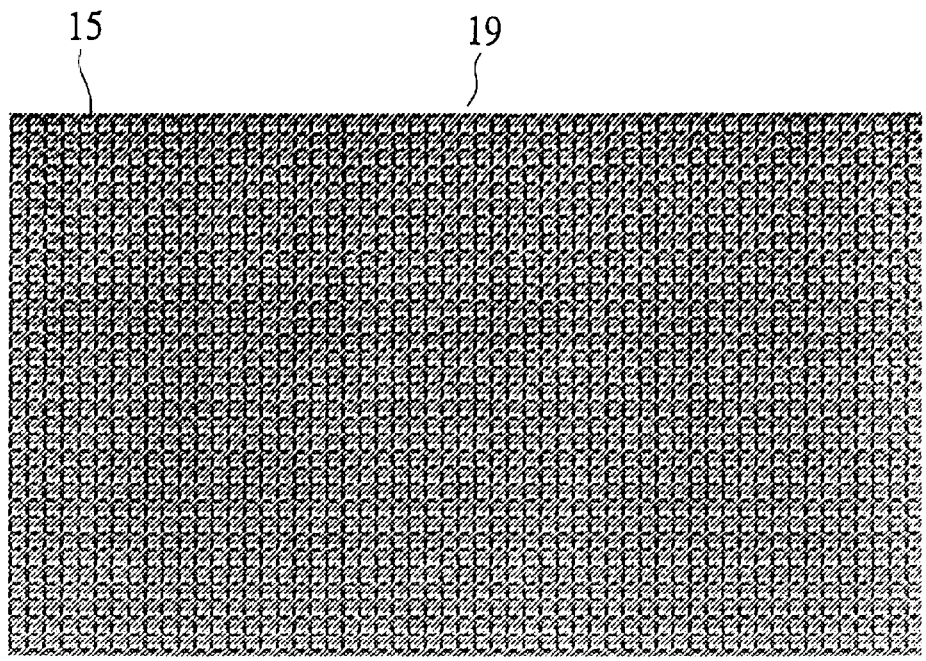
FIG. 4 is a schematic view showing that a large hidden image region is created by periodically duplicating the basic block of grating dots.

After determining the basic block of grating dots 15, the whole hidden image region 19 (as shown in FIG. 4) is created by a two-dimensional periodic duplication of the basic block of grating dots. This hidden image region 19 has a function of reconstructing the hidden image 18. When a convergent laser light 12 with proper illumination conditions incidents on the hidden image region 19, grating dots 2 will diffract the laser light 12 to proper positions in the space behind the hologram (for a transmassive type hologram) or before the hologram (for a reflective type hologram) to show the hidden image. Each bright element dot of the hidden image has its corresponding grating dot in every block of grating dots. However, it is difficult to view the reconstructed hidden image 18 directly by eyes since the eyes must view the hidden image along a direction reversing to the progressive direction of the diffracted light. The viewer must feel uncomfortable due to too bright light and can not see the whole hidden image 18 when a viewer sees the hidden image without using a ground glass. Therefore, in application, a ground glass 17 or a sheet of white paper locating at the imaging position of the hidden image 18 is necessary, so that the hidden image 18 may project on the ground glass or paper. Thus, such image has a characteristic of scattering light and thus it may be viewed from many directions easily.

The hidden image 18 may also be an image with its bright component dots possessing different brightness since it is only needed to control the diffractive efficiency of each grating dot. The arrangement of the grating dots in a block of grating dots 15 can be adjusted as desired, it is only necessary that the size of the block of grating dots 15 is much smaller than the position difference of the bright element dots in the same block of grating dots of the hidden image 18. Because the maximum position difference of the grating dots in a block of grating dots 15 is much smaller than the position difference of two adjacent bright element dots of the hidden image 18, the position exchanges of the grating a dots in the same block of grating dots will not affect the appearance of the reconstructed hidden image.

Figure 5:
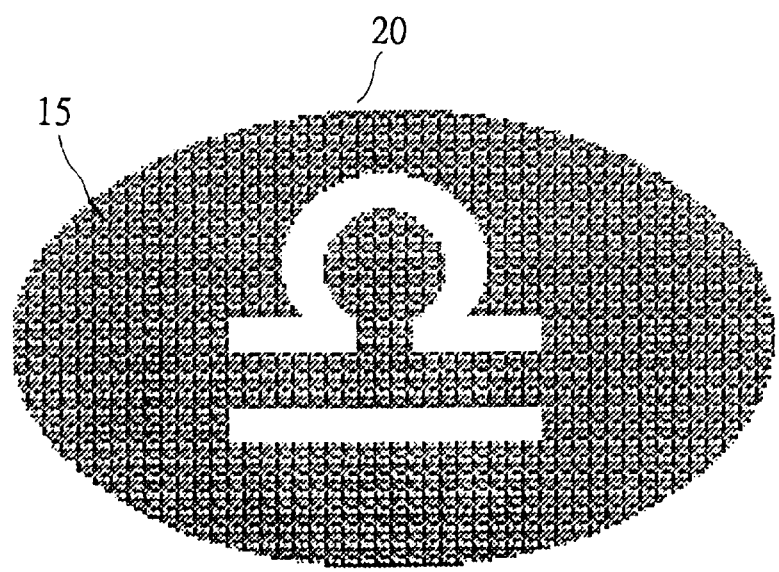
FIG. 5 is a schematic view showing that a special shape of region is cutted from a large hidden image region.
Figure 6:
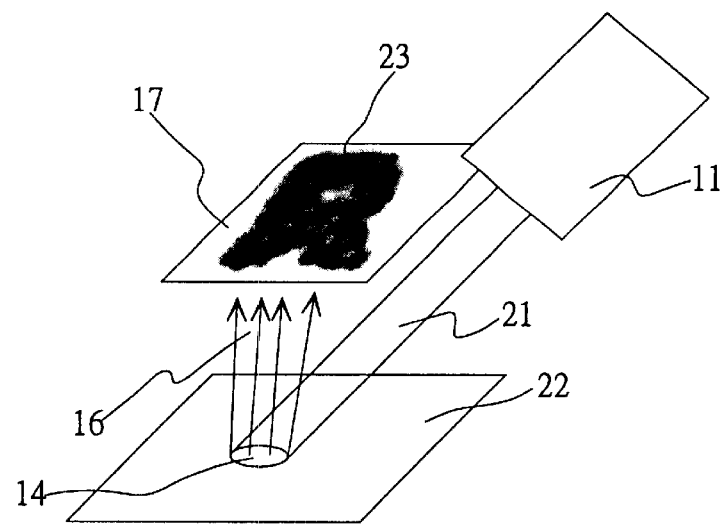
FIG. 6 is a schematic view showing that a hidden image is formed by diffraction of incident light with (a) plane wavefronts; (b) convergent wavefronts.
Figure 6:
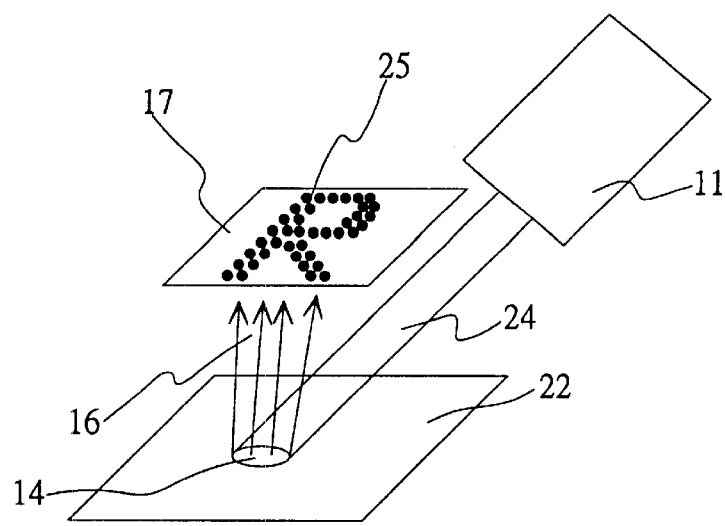

The basic block of grating dots 15 can be formed as a hidden region 19 with a large area by periodically duplicating (referring to FIG. 4). If necessary, a special hidden image region 20 may be designed (FIG. 5). When laser light 21 (as shown in FIG. 6a) with plane wavefronts, illuminates the hologram 22, all reconstructed bright element dots will have the same size as the illumination region 14 on the hidden image region so as to generate a hidden image 23 with bad quality. When the incident light 24 is a convergent light (as shown in FIG. 6b), the diffracted light may be diffracted and focused to small points, thus a hidden image 25 with good quality is formed.

Since the typical size of the illumination area of a hidden image region is several millimeters, in application, the length and width of the block of grating dots must not be great than 0.5 mm in order that the bright element dots of the hidden image do not change apparently with the illumination positions. On the other hand, the illumination region should include more entire blocks of grating dots to let the number of the completely illuminated blocks of grating dots be more than the number of the incompletely illuminated blocks of grating dots so that the incompletely illuminated blocks of grating dots does not seriously affect the brightness of the reconstructed hidden image.

In the aforesaid design, for a reflective type hologram, if the laser light illuminates the front surface of the hologram, the hidden image will appear in front of the front side of the hologram. For a transmissive type hologram, if the laser light illuminates the front surface, the hidden image will appear behind the back side of the hologram.

(1) . . . hologram
(2) . . . grating dot
(3) . . . grating
(4) . . . grating angle
(5) . . . grating pitch
(6) . . . size of grating dot
(7) . . . illuminating light
(8) . . . eye
(9) . . . incident light
(10) . . . diffracted light
(11) . . . laser
(12) . . . laser light
(13) . . . hologram with single block of grating dots only
(14) . . . illumination area
(15) . . . a block of grating dots
(16) . . . diffracted light
(17) . . . ground glass
(18) . . . reconstructed hidden image
(19) . . . large hidden image region
(20) . . . region with special shape cutted from a large hidden image region
(21) . . . incident light with plane wave fronts
(22) . . . hologram with its whole surface being a hidden image region
(23) . . . reconstructed hidden image with bad quality
(24) . . . incident light with convergent wavefronts
(25) . . . reconstructed hidden image with good quality

We claim:

1. A dot matrix hologram for producing a hidden image formed by a number of bright element dots, said dot matrix hologram comprising at least one hidden image region, the hidden image region being formed by periodically arranging identical blocks of grating dots in two dimensions;

wherein when a laser with convergent light illuminates the hidden image region with a proper direction from the front surface of the hologram, the hidden image is reconstructed by diffraction; and every block of grating dots in each block of grating dots being, equal to the number of bright element dots forming the hidden image, and each grating dot in each block of grating dots being designed to diffract incident laser light to form a different bright element dot of the hidden image.

2. The dot matrix hologram with a hidden image as claimed in claim 1 wherein the hologram is a reflective type hologram, and the hidden image is reconstructed in front of the front surface of the hologram.

3. The dot matrix hologram with a hidden image as claimed in claim 1 wherein the hologram is a transmissive type hologram, and the hidden image is reconstructed behind the back side of the hologram.

* * * * *